Patented May 17, 1932

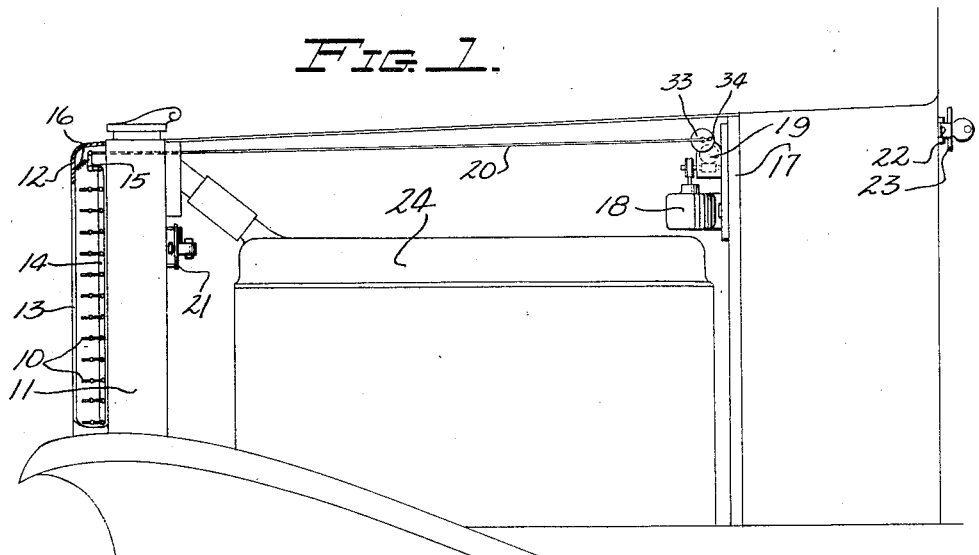
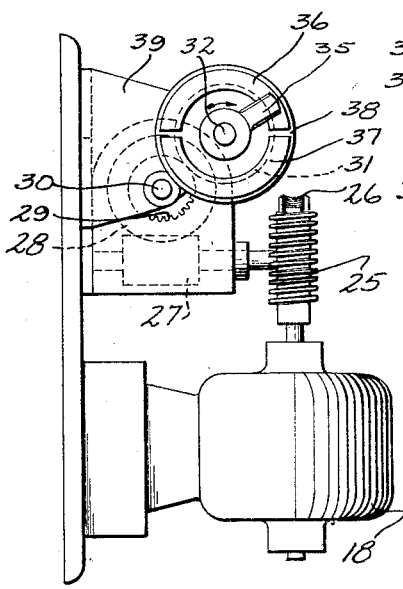
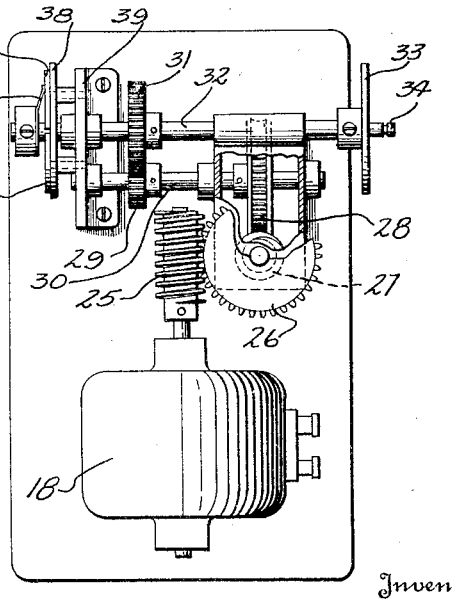

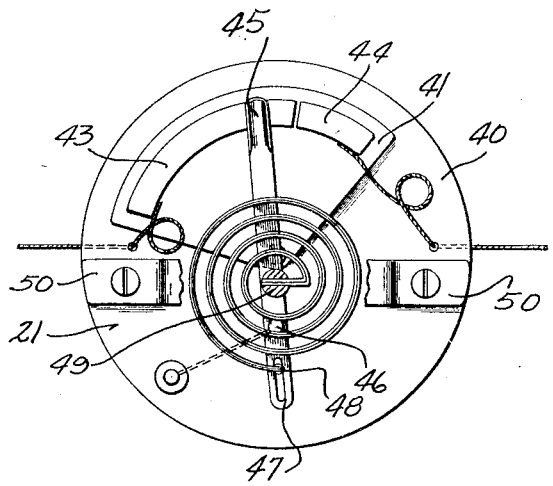
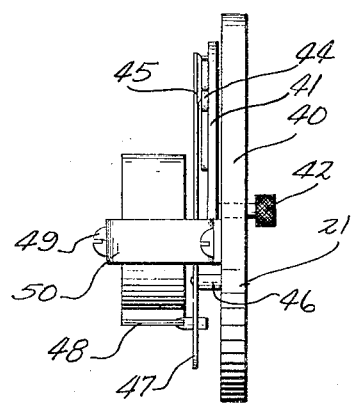
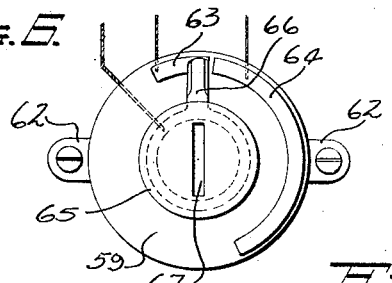
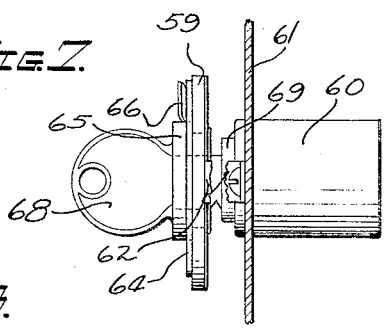
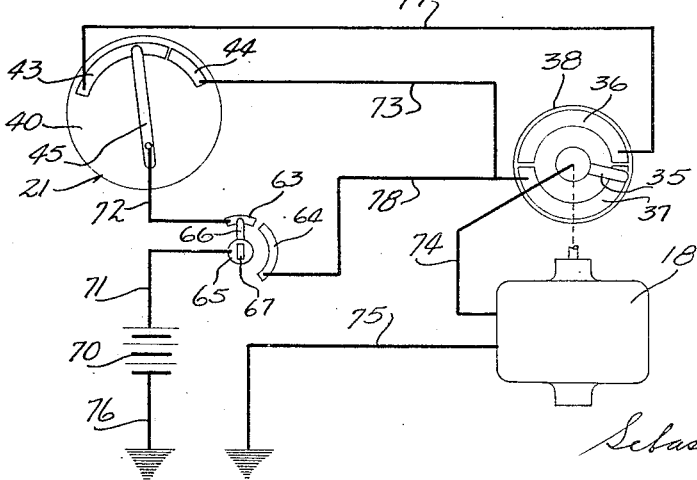

1,858,622

UNITED STATES PATENT OFFICE

SEBASTIAN GYSIN, OF MILWAUKEE, WISCONSIN

MOTOR CONTROL SYSTEM

Application filed December 14, 1929. Serial No. 414,199.

This invention relates to improvements in motor control systems.

It is an object of this invention to provide for automobile radiators, automatically operated shutters that will respond to temperature changes while the automobile engine is operating and that will remain closed while such engine is idle.

More specifically it is an object to provide motor actuated shutters in which the motor circuit is thermostatically, manually, and motor controlled, thereby accomplishing the desired response of the shutters as previously outlined.

Other improvements will be noted as the description of the drawings progresses and in which, Figure 1 is a view in side elevation of a fragmentary portion of an automobile showing an arrangement of the elements of the invention, the automobile being shown diagrammatically.

Figure 2 is a enlarged side view of the motor and switch operated thereby.

Figure 3 is a plan view of the device shown in Fig. 2.

Figure 4 is a plan view of a thermostatically operated switch.

Figure 5 is a side view of the device shown in Fig. 4.

Figures 6 and 7 show a manually operable switch.

Figure 8 is a diagram of the electrical circuit for controlling the shutter motor.

Like parts are identified by the same reference characters throughout the several views.

The shutters 10 are shown in Fig. 1 disposed horizontally across the front of the radiator 11, and pivotally supported by the frame 12 which is open at 13 to permit air to pass through the radiator when the shutters are open. The shutters are pivotally connected with each other by the link 14. This link is connected with the bell crank 15 which is supported by the frame 12. The bell crank is urged to a position substantially normal to that shown by means of a tension spring 16.

Mounted on the automobile dash 17 is a motor 18 having appropriate mechanism 19 (subsequently described) connecting it through rod 20 with the bell crank 15. Situated adjacent the radiator 11 is a thermostatically controlled switch 21 which will also be subsequently more fully described. Mounted on the dash and accessible to the driver, is an ignition control lock 22 and a manually controlled switch 23 adapted to be actuated by the ignition control lock key when the lock is manipulated thereby. The detail of the switch will be more fully described hereinafter.

Before describing the arrangement in detail, a general statement of what is accomplished is given that the purpose of each element and its manner of operation may be understood when more fully set forth. When the radiator 11 is warm and the automobile motor 24 is operating, the shutters 10 will be positioned as shown in Fig. 1, and when it is cold or the motor 24 is not operating, the shutters will be normal to the position shown. In other words, when the switches are as shown in Fig. 8, the shutters will be open. Any other relation of the switches will cause the motor 18 to close the shutters. The electrical circuits for energizing the motor 18 are shown in Fig. 8 but before describing this view a more detailed description of the circuit control devices will be set forth.

Referring to Figs. 2 and 3, the motor 18 is provided with a worm 25 meshing with the worm wheel 26 which in turn rotates the worm 27 meshing with the worm wheel 28. Worm wheel 28 rotates the pinion 29 through shaft 30. The pinion 29 drives gear 31 secured to shaft 32. Secured at one end of the shaft 32 is a disk 33 carrying the crank 34, and at the other end is a contact arm 35 arranged to contact with the stationary contacts 36 and 37 carried by the disk 38 supported from the bearing bracket 39. Thus when the motor is operating, the crank 34 and switch arm 35 will rotate in the direction indicated by the arrow in Fig. 2.

Figs. 4 and 5 show the thermostatically controlled switch 21. The base 40 supports segment 41 which may be adjusted for operation at various temperatures about the axis of the adjusting pin 42. The segment carries an arcuate contact 43 and a relatively shorter arcuate contact 44. A movable contact arm 45 pivotally supported at 46 from the base 40 is arranged to contact with the arcuate contacts 43 and 44. The arm 45 has a slotted end 47 which connects with the free end of the spiral spring 48. This spring is secured to the bracket 50 by means of screw 49 and is composed of two metals having different coefficients of expansion. Changes of temperature will therefore affect the spring and accordingly expansion thereof will move the arm 45 into engagement with contact 43 and contraction will move the arm to the contact 44.

The manual control switch 23 shown in Figs. 6 and 7 has a base 59 supported from plate 61 by bracket 62 and carries stationary contacts 63 and 64. Rotatably journaled in the base is a key receiving barrel 65 co-axial with the lock barrel 69 in the switch 60. The barrel 65 carries a contact arm 66 engageable with the contacts 63 and 64, and is provided with a key receiving aperture 67. When the key 68 is inserted into the switch lock barrel 69, it is passed through the aperture 67 in the barrel 65. As shown in Figs. 6 and 7, the key 68 has been turned 180° and thereby closed the switch 60. Consequently, the contact arm has been moved from the contact 64 to the contact 63.

Fig. 8 illustrates the electrical circuits. As shown, the switches are in the positions noted, when the shutters 10 are open. If the temperature drops below a predetermined value, the thermostatic spring 48 will cause arm 45 to move into contact with the stationary contact 44. As a result an electrical circuit will be established comprising battery 70, wire 71, contact 66, contact 63, wire 72, contact 45, contact 44, wire 73, contact 37, arm 35, wire 74, motor 18, wire 75, ground, and wire 76. The motor 18 will then be energized and through the mechanism previously described will rotate the contact arm 35 and crank 34. When the arm 35 has reached the contact 36, the foregoing circuit will be opened. Therefore, the motor will stop and the crank 34 will have rotated 180° to a position opposite that shown in Fig. 1. The rod 20 will thereby have been moved forwardly and have permitted the spring 16 to close the shutters through the bell crank 15 and link 14.

When the temperature rises sufficiently, the thermostatic switch arm 45 will be automatically moved to the contact 43. If the arm 35 is still on contact 36, an electrical circuit will be established through the motor comprising battery 70, wire 71, contacts 66 and 63, wire 72, contacts 45 and 43, wire 77, contacts 35 and 36, wire 74, motor 18, wire 75, ground, and wire 76. The motor 18 will then rotate the arm 35 to the position shown in Fig. 8 at which time the circuit indicated will be opened. Consequently the motor will have moved the crank to the position shown in Fig. 1 and through rod 20, bell crank 15, and link 14 opened the shutters 10 as shown.

The foregoing operations take place only when the automobile motor 24 is running. When the motor 24 is not operating, the manual switch arm 66 is on contact 64. If arm 35 is on contact 37 as shown, when the arm 66 is on contact 64, an electrical circuit will be closed comprising battery 70, wire 71, contacts 66 and 64, wire 78, contacts 35 and 37, wire 74, motor 18, wire 75, ground, and wire 76. The motor 18 will then move the arm 35 to the contact 36 thereby opening the circuit. At the same time the shutters 10 will be closed by the motor through cranks 34, rod 20, bell crank 15, and link 14.

During cold weather the thermostatic switch arm 45 will be on contact 44 and when the manual switch arm 66 is moved to contact 63 no circuit will be established, since the arm 35 will be on contact 36. Consequently, the motor 24 will have an opportunity to warm up quickly before the shutters are opened. Under these conditions the shutters will not be opened until the contact arm 45 is on the contact 43.

It is obvious that the manual control switch may be dispensed with if thermostatic control only is desired. It is equally as obvious that the thermostatic control switch may be eliminated if it is desired to control the shutters by manual manipulation only, of the switch 23. In either case the sequence of operation will be the same. In the latter case, however, the shutters will always be open when the motor 24 is running, and closed when it is not running. In the former case the shutters will be open when the temperature is above a given value, and closed when it is below that value. The advantages of both switches may be attained by combining them as indicated.

The type of switches shown may be classified as "single pole, double terminal," and are referred to as three way switches. Where this term is used in the claims, it is intended that any switch serving to accomplish thermostatic control of the shutters when the motor is running, and manual control thereof on starting or stopping the motor, may be included.

I claim:

1. In a motor control system, the combination of an electrical motor, a source of electrical energy, three switches each comprising a movable contact and two stationary contacts, electrical conductors connecting the stationary contacts of one of the switches with the stationary contacts of another of the switches, one of the stationary contacts of the remaining switch being electrically connected with the movable contact of one of the other switches, and the other stationary contact of said remaining switch being electrically connected with the stationary contact of the second of the other switches, and electrical conductors connecting the movable contacts of two of the switches, motor and electrical source.

2. In a motor control system, the combination of an electrical motor, a source of electrical energy, a thermostatically controlled switch, a manually controlled switch, a motor controlled switch, each of said switches comprising a single pole and two terminals, the terminals of the motor controlled switch being electrically connected with the terminals of one of the other said switches, one of the terminals of one of the last mentioned switches being connected with the pole of the other of said last mentioned switches and the other terminal of the first of the last mentioned switches being electrically connected with a terminal of the motor controlled switch, and electrical conductors connecting said source of electrical energy, manually controlled switch, and electrical motor.

SEBASTIAN GYSIN.